(12) United States Patent
Lalezari et al.

(10) Patent No.: US 11,621,748 B1
(45) Date of Patent: Apr. 4, 2023

(54) HIGH-POWER TRANSMIT BEAMFORMING WITH IMPEDANCE-MISMATCHED ANTENNA ARRAYS

(71) Applicant: FIRST RF Corporation, Boulder, CO (US)

(72) Inventors: Arian C. Lalezari, Boulder, CO (US); Farzin Lalezari, Boulder, CO (US); Michael R. Markey, Broomfield, CO (US); Michael R. Goulder, Longmont, CO (US)

(73) Assignee: FIRST RF Corporation, Boulder, CO (US)

( * ) Notice: Subject to any disclaimer, the term of this patent is extended or adjusted under 35 U.S.C. 154(b) by 0 days.

(21) Appl. No.: 17/530,223

(22) Filed: Nov. 18, 2021

(51) Int. Cl.
*H04B 7/0426* (2017.01)
*H04B 7/0456* (2017.01)
*H04B 7/06* (2006.01)

(52) U.S. Cl.
CPC .......... *H04B 7/043* (2013.01); *H04B 7/0456* (2013.01); *H04B 7/0617* (2013.01)

(58) Field of Classification Search
CPC ..... H04B 7/043; H04B 7/0456; H04B 7/0617
See application file for complete search history.

(56) References Cited

U.S. PATENT DOCUMENTS

| | | | |
|---|---|---|---|
| 8,295,840 B2 * | 10/2012 | Ishii | H04B 7/0645 455/69 |
| 8,923,924 B2 | 12/2014 | Reinhardt et al. | |
| 9,867,147 B2 * | 1/2018 | Pelletier | H04L 1/1812 |

OTHER PUBLICATIONS

Bengtsson et al., "Optimum and Suboptimum Transmit Beamforming," *Handbook of Antennas in Wireless Communications*, CRC Press, Jan. 2001, 34 pages.
Browne et al., "Experiments with Compact Antenna Arrays for MIMO Radio Communications" UnWiReD Laboratory, Antenna Research and Measurements Laboratory, Department of Electrical Engineering, 22 pages, University of California at Los Angeles, Los Angeles, CA 90095-1594.
Cao et al., "Optimal Transmit Strategy for MIMO Channels with Joint Sum and Per-Antenna Power Constraints,", IEEE, Mar. 2017, pp. 3569-3573.
Honda et al., "A Simultaneous Conjugate-Matching Algorithm for N-Element Array Antennas," IEICE Communications Express, vol. 4, No. 11, Nov. 16, 2015, pp. 327-332.

(Continued)

*Primary Examiner* — Vineeta S Panwalkar
(74) *Attorney, Agent, or Firm* — Cozen O'Connor

(57) ABSTRACT

A method for controlling an antenna array includes determining, based on a beamstate, an initial weight vector of excitations. The initial weight vector is transformed into an active-impedance vector. When the modulus of any element of the active-impedance vector exceeds a threshold, the initial weight vector is unsafe. In this case, a substitute weight vector is identified such that (i) the initial and substitute weight vectors have a similarity measure that exceeds a similarity threshold and (ii) the substitute weight vector is safe. The antenna array may then be driven according to the substitute weight vector to emit radiation having a radiation pattern that approximates that of the beamstate. The substitute weight vector may be found by searching a library of safe weight vectors or by adjusting the excitations of the initial weight vector until a safe alternative is found.

40 Claims, 9 Drawing Sheets

(56) References Cited

OTHER PUBLICATIONS

Rashid-Farrokhi et al., "Transmit Beamforming and Power Control for Cellular Wireless Systems," IEEE Journal on Selected Areas in Communications, vol. 16, No. 8, Oct. 1998, pp. 1437-1450.

Suban et al., "Beamforming with Per-Antenna Power Constraint and Transmit Antenna Selection Using Convex Optimization Technique," Signal & Image Processing: An International Journal (SIPIJ), vol. 5, No. 3, Jun. 2014, pp. 59-69.

Taluja et al., "Diversity Limits of Compact Broadband Multi-Antenna Systems" IEEE Journal on Selected Areas in Communications, Oct. 23, 2012, 12 pages.

Vu, "MISO Capacity with Per-Antenna Power Constraint," IEEE Transactions on Communications, , Jun. 2011, 8 pages.

Yu et al., "Transmitter Optimization for the Multi-Antenna Downlink with Per-Antenna Power Constraints," IEEE Transactions on Signal Processing, vol. 55, No. 6, Jun. 2007, pp. 2646-2660.

Wallace et al., "Mutual Coupling in MIMO Wireless Systems: A Rigorous Network Theory Analysis," 2004, 11 pages.

Yeang et al., "Dense Transmit and Receive Phased Arrays," Proceedings of the 2010 IEEE International Symposium on Phased Array Systems and Technology (ARRAY), IEEE, 2010, pp. 934-939.

Zheng et al., "MIMO Transmit Beamforming Under Uniform Elemental Power Constraint," IEEE Transactions on Signal Processing, vol. 55, No. 11, Nov. 2007, pp. 5395-5406.

\* cited by examiner

HIGH-POWER TRANSMIT BEAMFORMING WITH IMPEDANCE-MISMATCHED ANTENNA ARRAYS

BACKGROUND

Transmit beamforming techniques identify weights with which an antenna array should be driven to produce a specified radiation pattern. Each of the weights designates an amplitude and phase of an oscillating electrical signal that drives a corresponding element of the antenna array. The weights are selected such that interference between the electromagnetic fields emitted by the antenna elements produces the specified radiation pattern. For example, the weights may be selected such that the radiation pattern is shaped as an electromagnetic beam propagating in a direction away from the antenna array. The weights may be additionally selected such that the beam has one or more other properties, such as a polarization, power, intensity, and spatial beamwidth. The weights may alternatively be selected such that the antenna array emits a plurality of electromagnetic beams, each with its own properties and propagation direction.

Some antenna arrays are electronically scannable, meaning that the weights can be individually programmed, allowing the resulting radiation pattern to be changed over time. For example, consider an antenna array mounted to an airplane. To ensure that a radiated beam tracks a fixed receiver on the ground, the weights may be changed over time to change the propagation direction of the beam according to the movement of the airplane. In another example, consider an antenna array mounted to a helicopter performing a hovering turn (i.e., the helicopter is translationally stationary, but rotating about its mast). In this case, the weights may be changed over time while the helicopter rotates to ensure that the radiated beam is always tracking the fixed receiver. While these examples show how beam direction can be electronically controlled to achieve spatial diversity, the weights may also be changed over time to affect one or more of any other beam parameter (polarization, power, sidelobe levels, location of nulls, etc.).

The properties of a radiation pattern may be determined from a model of the antenna array in combination with the amplitudes and phases of the driving electrical signals. The model encapsulates physical features of the antenna array, such as the number of antenna elements, the sizes and configurations of the antenna elements, geometry (e.g., location of counterpoises or ground planes), and materials (e.g., dielectric constants). The model may also account for how these physical features depend on frequency. An inversion algorithm can use the model to determine which inputs (i.e., weights) will yield a target output (i.e., the transmitted beamstate). For example, an optimization algorithm can iteratively update the weights so that the output predicted by the model converges to the target output.

SUMMARY

The present embodiments presented may be used with conventional transmit beamformers to advantageously prevent damage to power amplifiers driving an antenna array. Especially in high-power applications, conventional transmit beamformers may identify weights that permanently damage the output stage of one or more of the power amplifiers when attempting to operate with the identified weights. This damage arises from two backflow signals that flow back into the amplifier. The first backflow signal is the reflection of the amplifier's output caused by an impedance mismatch between the amplifier and the corresponding antenna element. The second backflow signal arises from coupling between the corresponding antenna element and other antenna elements that are actively driven. In other words, the second backflow signal arises from the corresponding antenna element receiving the electromagnetic fields emitted from the other antenna elements. These backflow signals can be described in terms of a S-matrix that characterizes the entire antenna array as a linear electrical network.

The present embodiments determine if a vector of weights, identified by a conventional transmit beamformer for a corresponding target radiation pattern, would result in a backflow signal capable of damaging a power amplifier. Such an "unsafe" weight vector, when identified, may then be compared to a library of safe weight vectors that are known to result in safe operation of the antenna array. A substitute weight vector that is "close" to the unsafe weight vector may then be selected from the library, and the antenna array may then be driven according to the substitute weight vector to ensure that no power amplifiers are damaged. A substitute weight vector is described herein as being "similar" to a weight vector if a substitute radiation pattern corresponding to the substitute weight vector is similar enough to the target radiation pattern that the substitute transmission pattern can replace the target transmission pattern for the application at hand. Ways to quantify similarity and thresholds for accepting substitute weight vectors in lieu of unsafe weight vectors are described in more detail below.

One aspect of the present invention is the realization that the number of acceptable weight vectors for inclusion in the library may be too large to construct in real-time (i.e., during operation of the antenna array). Accordingly, some embodiments herein implement pre-conditioning in which a plurality of candidate weight vectors are used with an S-matrix to identify candidate weight vectors that are safe (i.e., that will not give rise to any damage-inducing backflow signal). These weight vectors may then be included in the library. In some embodiments, the pre-conditioning may occur on a separate computer system, such as a massively parallel multi-core system. The resulting library may be subsequently communicated to the antenna system (e.g., wirelessly, or via a memory card) for use during transmission. Thus, the library is only searched during transmission, advantageously speeding up operation.

More specifically, for each candidate weight vector, an active impedance is calculated for each channel of the antenna array. The active impedance is the impedance seen by one power amplifier when connected to its corresponding antenna element and when all the other antenna elements are actively driven. Thus, a candidate weight vector of N weights, one for each of N corresponding antenna elements, gives rise to an active-impedance vector of N corresponding active impedances. A candidate weight vector is discarded or ignored if one or more of its corresponding active impedances has a modulus exceeding a safety threshold. If all of the active impedances have moduli below the safety threshold, the candidate weight vector may then be inserted to the library as a safe weight vector.

To appreciate how large the library of acceptable weight vectors can be, consider an N-element antenna array that is driven to radiate one electromagnetic beam. Steering the one electromagnetic beam over $4\pi$ steradians of the unit sphere with a resolution of 1° in both polar and azimuthal angles (i.e., 1 square degree) corresponds to approximately $N_A \approx 41$, 253 different angular states. Thus, $N_A$ quantifies spatial diversity of the antenna array. The total number of beamstates $N_{BS}$ for the one electromagnetic beam is $$N_{BS} = N_A \times N_P \times N_f = 41,253 \times 2 \times \frac{BW}{\Delta f},$$

where $N_P=2$ is the number of polarization states, $N_f$ is the number of frequency states, BW is frequency bandwidth, and $\Delta f$ is frequency resolution. Further assuming $N_f=1,000$ yields $N_{BS} \approx 8.2 \times 10^8$ different beamstates. Ideally, the goal is to identify at least one safe weight vector for each of the beamstates. If each weight is represented as 2 bytes (e.g., 1 byte for the amplitude and 1 byte for the phase), the corresponding N-element weight vector can be represented as 2N bytes, or 32 bytes for an array with N=16 elements. In total, the library would require storage of 2.6 gigabytes (GB). When the antenna array is driven to radiate two electromagnetic beams with the same amplitude and phase (but different directions, polarizations and frequencies), a similar estimate yields an additional storage requirement of 217 petabytes. Exponentially more storage is needed for the library to accommodate weight vectors corresponding to more than two electromagnetic beams.

As shown with the above estimates, the size of the library (i.e., the number of safe weight vectors in the library) may be so large that the time needed to search the library is prohibitively long, resulting in an unacceptable time delay when switching beamstates. Accordingly, some embodiments herein operate in an "adaptive mode" that builds the library based on beamstates that are targeted during operation of the antenna array. For example, a weight vector determined by the transmit beamformer in response to an inputted beamstate may be inserted to the library if each active impedance calculated for the weight vector has a modulus below the safety threshold. Advantageously, these embodiments prevent the library from being populated with weight vectors that are never used. Furthermore, as the library grows, it may be shared with similar systems based on the same antenna-array design. The adaptive mode may be implemented with a library that is either initially empty or initially populated with safe weight vectors obtained via preprocessing.

Any application that uses high-power transmit beamforming may benefit from the embodiments herein, including radar, radio jamming, directed energy (e.g., power transfer), wireless communications, electron accelerators, and materials processing. Lower power applications may also benefit from the embodiments, especially for antenna arrays formed from antenna elements that are strongly coupled. Many non-uniform antenna arrays designed for high polarization and spatial diversities have such strongly-coupled antenna elements. By contrast, in many uniform antenna arrays, coupling between elements is minimized by placing each element in an antinode of the electromagnetic field emitted of each of its nearest-neighbor elements.

In embodiments, a method for controlling an antenna array includes determining, based at least on a beamstate, an initial weight vector of excitations of corresponding antenna elements of the antenna array. The method also includes, when the initial weight vector is unsafe, identifying, based at least on the initial weight vector, a substitute weight vector such that (i) the initial and substitute weight vectors have a similarity measure that exceeds a similarity threshold and (ii) the substitute weight vector is safe. The method also includes, when the initial weight vector is unsafe, driving the antenna array according to the substitute weight vector to emit radiation. The emitted radiation has a transmitted radiation pattern that approximates a target radiation pattern of the beamstate.

In other embodiments, a system for controlling an antenna array includes a processor and a memory communicably coupled with the processor. The memory stores machine-readable instructions that, when executed by the processor, control the system to determine, based at least on a beamstate, an initial weight vector of excitations of corresponding antenna elements of the antenna array. The memory also stores machine-readable instructions that, when executed by the processor, control the system to, when the initial weight vector is unsafe, identify, based at least on the initial weight vector, a substitute weight vector such that (i) the initial and substitute weight vectors have a similarity measure that exceeds a similarity threshold and (ii) the substitute weight vector is safe. Also when the initial weight vector is unsafe, the machine-readable instructions control the system to output the substitute weight vector to the antenna array. The antenna array, when driven according to the substitute weight vector, emits radiation having a transmitted radiation pattern that approximates a target radiation pattern of the beamstate.

In other embodiments, a method for constructing a library of safe weight vectors includes determining, for each of a plurality of beamstates, a corresponding one of a plurality of candidate weight vectors. Each of the plurality of candidate weight vectors specifies excitations of corresponding antenna elements of an antenna array. The method also includes inserting, to the library, one or more of the plurality of candidate weight vectors when each of said one or more of the plurality of candidate weight vectors is safe.

DETAILED DESCRIPTION

Figure 1:
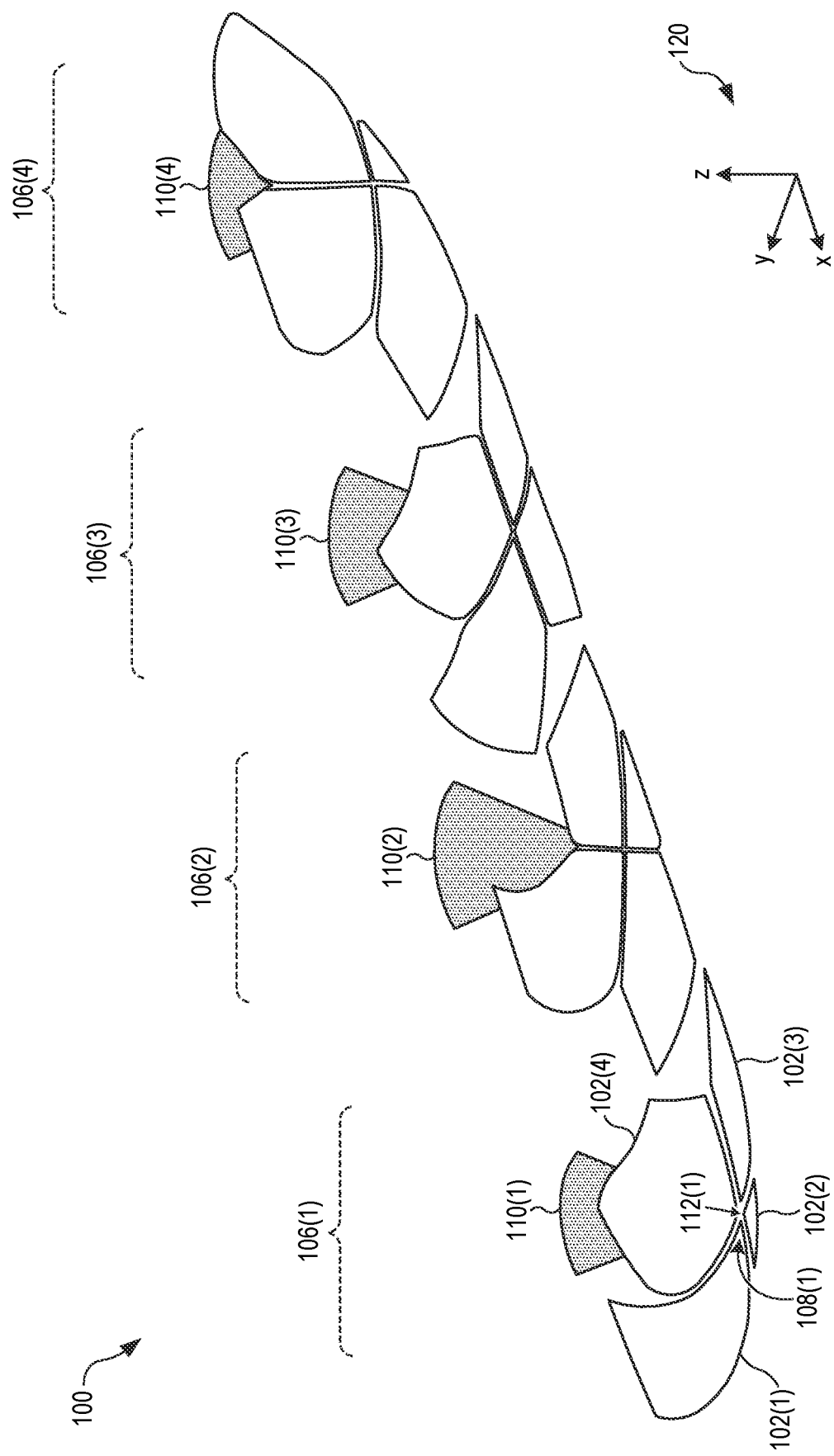
FIG. 1 is a perspective view of an antenna array with which embodiments described herein may be implemented.

FIG. 1 is a perspective view of an antenna array 100 with which embodiments described herein may be implemented. The antenna array 100 is a non-uniform array having a plurality of clusters 106, each with four antenna elements 102. Each cluster 106 also includes a conical counterpoise 110 located above a center 112 of the cluster 106 in the z direction (see right-handed coordinate system 120). For example, a first element 102(1), a second element 102(2), a third element 102(3), and a fourth element 102(4) cooperate with a first counterpoise 110(1) to form a first cluster 106(1). While the antenna array 100 shows sixteen elements 102 forming four clusters 106 with four counterpoises 110, the antenna array 100 may alternatively have any number and configuration of elements 102, clusters 106, and counterpoises 110 without departing from the scope hereof. Additional examples of elements 102, clusters 106, and counterpoises 110 which can be used with the embodiments herein may be found in U.S. patent application Ser. No. 16/366,081, which is incorporated herein by reference.

Each antenna element 102 is electrically connected to a feed at a feed location 108 located near the center 112 of the corresponding cluster 106. For example, in FIG. 1 the first element 102(1) has a first feed location 108(1) located near a first center 112(1) of the first cluster 106(1). Within each cluster 106, each of the four elements 102 may be independently driven with an electrical signal whose amplitude and phase are controllable. Based on the four amplitudes and phases applied to the four elements of one cluster 106, an electromagnetic wave of any intensity and polarization (e.g., circular, linear, elliptical) can be transmitted by the one cluster 106. For example, when two signals with equal amplitudes and 180° out of phase are applied to the first and third elements 102(1) and 102(3), and no signal (i.e., zero amplitude) is applied to the second and fourth elements 102(2) and 102(4), the resulting electromagnetic wave will be linearly polarized in the horizontal plane (i.e., the x-y plane) at 45° relative to the positive x axis.

In FIG. 1, the four antenna elements 102(1)-102(4) of the first cluster 106(1) are arranged in an "x" configuration. Specifically, near the first center 112(1), the four elements 102(1)-102(4) are arranged such that one of the four elements 102(1)-102(4) lies in each of four quadrants about the first center 112(1), where the boundaries of these four quadrants are parallel to the x and y axes of the coordinate system 120. By contrast, the four elements 102 of a second cluster 106(2) are arranged in a "+" configuration such that the four elements 102 are centered on the boundaries between quadrants. Thus, the four clusters 106 of the antenna array 100 are arranged in an interleaving x+x+ configuration, as shown in FIG. 1 from left to right.

The arrangement of antenna elements 102 into clusters 106 and the interleaving of the clusters 106 are two ways in which the antenna array 100 is non-uniform. In addition, the distance between any two elements 102 within one cluster 106 (e.g., as measured from their respective feed locations 108) may be less than one-half of a wavelength $\lambda$ of the electromagnetic wave, in which case the elements 102 may be strongly coupled to each other. By comparison, elements in a uniform antenna array are typically equispaced along a single line by $\lambda/2$, which minimizes coupling between elements by placing each element in the node of the field emitted by each of its nearest-neighbor elements. Advantageously, non-uniformity increases the spatial and polarization diversities of the antenna array 100. The present embodiments may be implemented with either a uniform antenna array or a non-uniform antenna array.

The antenna array 100 may be used for broadband operation to achieve frequency diversity as well. For example, the antenna elements 102 may be non-resonantly driven to ensure efficient transmission over a wide range of frequencies. In addition, the antenna elements 102 may be curved in three dimensions, as shown in FIG. 1, to provide capacitive loading that extends low-frequency performance, as described in U.S. patent application Ser. No. 16/366,081. However, the elements 102 may have another shape (e.g., planar) without departing from the scope hereof. Similarly, the counterpoises 110, while shown in FIG. 1 as being conical, may have another shape (e.g., planar) without departing from the scope hereof.

Figure 2:
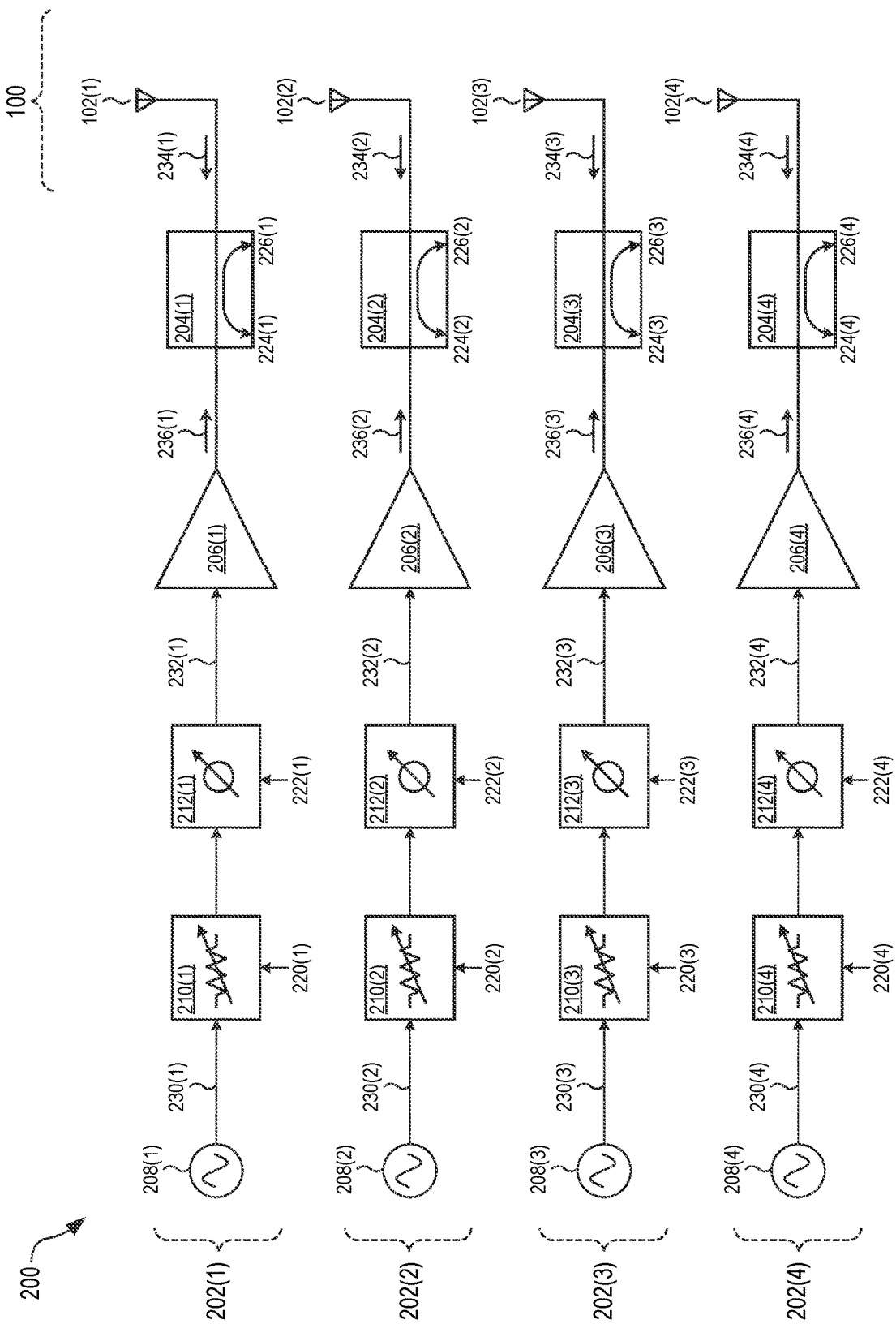
FIG. 2 shows a multi-channel driver that may be used for driving the antenna array antenna array of FIG. 1 to transmit a beamstate.

FIG. 2 shows a multi-channel driver 200 that may be used for driving the antenna array 100 of FIG. 1. The multi-channel driver 200 includes a plurality of channels 202, one for each antenna element 102. Thus, while only four channels 202(1)-202(4) are shown in FIG. 2 for clarity, sixteen channels 202 are needed to drive the sixteen elements 102 of the antenna array 100. Each channel 202 sets the phase and amplitude of a sine wave used to drive its corresponding antenna element 102. For each channel 202, the phase and amplitude of the sine wave are collectively referred to as the "weight" of the channel. Thus, the weights of all the channels are set (i.e., the channels are "weighted") such that the antenna array 100 transmits a target beamstate (e.g., direction, polarization, intensity, number of beams, etc.).

A first channel 202(1) of the multi-channel driver 200 includes an oscillator 208(1) that outputs a sine wave 230(1). The oscillator 208(1) may be an RF or microwave oscillator (e.g., based on a quartz or YIG crystal, or a dielectric resonator), a frequency synthesizer (e.g., a direct-digital or phase-locked loop synthesizer), a function or signal generator, or another type of circuit capable of generating a sine wave at the transmission frequency. Where multiple antenna elements 102 are driven at the same frequency, the corresponding channels 202 may use a common oscillator 208, advantageously reducing component count and power consumption. For example, when the four antenna elements 102(1)-102(4) of the first cluster 106(1) are driven at the same frequency, the four channels 202(1)-202(4) may use only one oscillator (e.g., oscillator 208(1)), whose outputted sine wave 230(1) is split four ways prior to attenuating and phase-shifting.

The first channel 202(1) also includes a variable attenuator 210(1) that is controlled via an attenuator control signal 220(1), and a variable phase shifter 212(1) that is controlled via a phase-shifter control signal 222(1). The variable attenuator 210(1) may be a voltage-variable or current-variable attenuator, wherein the attenuator control signal 220(1) is an analog signal that sets an attenuation level of the variable attenuator 210(1). Alternatively, the variable attenuator 210(1) may be a digitally programmable attenuator, wherein the attenuator control signal 220(1) includes a plurality of digital signals used to set the attenuation level. Similarly, the variable phase shifter 212(1) may be controllable via an analog signal, or a plurality of digital control signals, such that the variable phase shifter 212(1) phase-shifts the sine wave. While FIG. 2 shows the variable attenuator 210(1) preceding the variable phase shifter 212(1), their order may be swapped. The variable attenuator 210(1) and the variable phase shifter 212(1) may be combined with the oscillator 208(1) to form a frequency synthesizer with phase and amplitude control.

The first channel 202(1) also includes a power amplifier 206(1) that amplifies an attenuated and phase-shifted sine wave 232(1) into an amplified signal 236(1) that is fed to the first antenna element 102(1) through a four-port directional coupler 204(1). An attenuated signal 226(1) derived from the amplified signal 236(1) is outputted from a coupled port of the directional coupler 204(1). Although not shown in FIG. 2, the attenuated signal 226(1) may be directed to an amplitude detector, log amplifier, analog-to-digital converter (ADC), or another circuit that monitors the amplified signal 236(1). The four-port directional coupler 204(1) also has an isolation port used to monitor a reverse signal 234(1) traveling from the antenna element 102(1) towards the output of the power amplifier 206(1). An isolation signal 224(1) derived from the reverse signal 234(1) is outputted from the isolation port, and may also be directed to an amplitude detector, log amplifier, ADC, or another circuit that monitors the reverse signal 234(1).

Although not shown in FIG. 2, the multi-channel driver 200 may include isolators that are located after the power amplifiers 206 and divert reverse signals 234 away from the output stages of the power amplifiers 206. In some situations, these isolators allow the power amplifiers 206 to be driven harder (i.e., at higher output powers) without risk of damage from the reverse signals 234. In other situations, insertion loss and bandwidth limitations of the isolators may preclude their use, depending on the application at hand.

Figure 3:
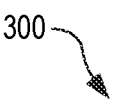
FIG. 3 shows a N×N S-matrix having complex S-parameters $\{S_{i,j}\}$ that quantify reflections and coupling between the N antenna elements of the antenna array of FIG. 1.

FIG. 3 shows a N×N S-matrix 300 having complex S-parameters $\{S_{i,j}\}$ that quantify reflections and coupling between the N antenna elements 102. The S-matrix 300 is also referred to herein as S. Each S-parameter $S_{i,k}$ of the S-matrix 300 is a complex number equal to the ratio of the $i^{th}$ amplified signal 236($i$) and a component of the $i^{th}$ reverse signal 234($i$) due to free-space coupling between the $i^{th}$ and $k^{th}$ antenna elements 102($i$) and 102($k$). The $i^{th}$ and $k^{th}$ antenna elements 102($i$) and 102($k$) are assumed to be driven with sine waves of equal amplitude and phase, thereby ensuring that the phase of the S-parameter $S_{i,k}$ corresponds to the phase shift induced by the free-space coupling (as opposed to a phase difference between the amplified signals 236($i$) and 236($k$) themselves), and that the amplitude of the S-parameter $S_{i,k}$ corresponds to the attenuation induced by the free-space coupling (as opposed to an amplitude difference between the amplified signals 236($i$) and 236($k$) themselves). To ensure reciprocity, the S-matrix 300 is equal to its transpose (i.e., $S_{m,n}=S_{n,m}$). Each diagonal element $S_{i,i}$ of the S-matrix 300 quantifies the reflection of the $i^{th}$ amplified signal 236($i$) from the $i^{th}$ antenna element 102($i$) due to an impedance mismatch between the $i^{th}$ power amplifier 206($i$) and the $i^{th}$ antenna element 102($i$).

The antenna array 100 may be driven by selecting a column vector of N weights $w=[w_1, w_2, \ldots, w_N]^T$, one for each of the N channels 202. For the $k^{th}$ channel 202($k$), the weight $w_k = A_k e^{j\phi_k}$ represents the amplitude $A_k$ and phase $\phi_k$ of the $k^{th}$ amplified signal 236($k$), where $j=\sqrt{-1}$. The N reverse signals 234 can be similarly represented as a column vector $a=[a_1, a_2, \ldots, a_N]^T$, where $a_k$ is a complex number representing the amplitude and phase of the $k^{th}$ reverse signal 234($k$). The vector $w$ is also referred to herein as a weight vector, and each weight $w_k$ is also referred to herein as an excitation. The vector $a$ is referred to herein as a reverse-signal vector. Dividing each reverse signal 234($k$) by its corresponding amplified signal 236($k$) yields an active impedance $\Gamma_k$. The vector of all active impedances is denoted $\Gamma=[\Gamma_1, \Gamma_2, \ldots, \Gamma_N]^T$ and referred to herein as an active-impedance vector.

Mathematically, the weight vector $w$ and the reverse-signal vector $a$ are mathematically related by:

$$a = Sw. \qquad (1)$$

Thus, for the $i^{th}$ channel 202($i$), the active impedance $\Gamma_i$ can be expressed:

$$\Gamma_i = \frac{1}{w_i} \sum_{k=1}^{N} S_{i,k} w_k = S_{i,1} \frac{w_1}{w_i} + S_{i,2} \frac{w_2}{w_i} + \ldots S_{i,i} + \ldots S_{i,N} \frac{w_N}{w_i} = \qquad (2)$$

$$S_{i,1} \frac{A_1}{A_i} e^{j(\phi_1 - \phi_i)} + \ldots S_{i,i} + \ldots S_{i,N} \frac{A_N}{A_i} e^{j(\phi_N - \phi_i)}.$$

Since each S-parameter it complex, it can change one or both of the amplitude and phase of its corresponding term in Eqn. 2. The terms in Eqn. 2 may therefore add constructively or destructively.

The S-matrix S may be obtained in any of several ways. For example, it can be measured from forward-coupled signals (e.g., the attenuated signals 226 in FIG. 2) and back-isolated signals (e.g., the isolation signals 224 in FIG. 2) outputted by a four-port directional coupler placed between each power amplifier 206($i$) and its corresponding antenna element 102($i$) (e.g., the direction couplers 204 in FIG. 2). For these measurements, the antenna array 100 may be driven with a low-power weight vector $w$ that is known to result in safe operation. From the resulting measurements, it can be determined how much the weight vector $w$ can be scaled up in power until a power amplifier 206 is damaged. Alternatively, the S-matrix S can be determined numerically from analytical formulas, computer simulation, or a combination thereof.

Figure 4:
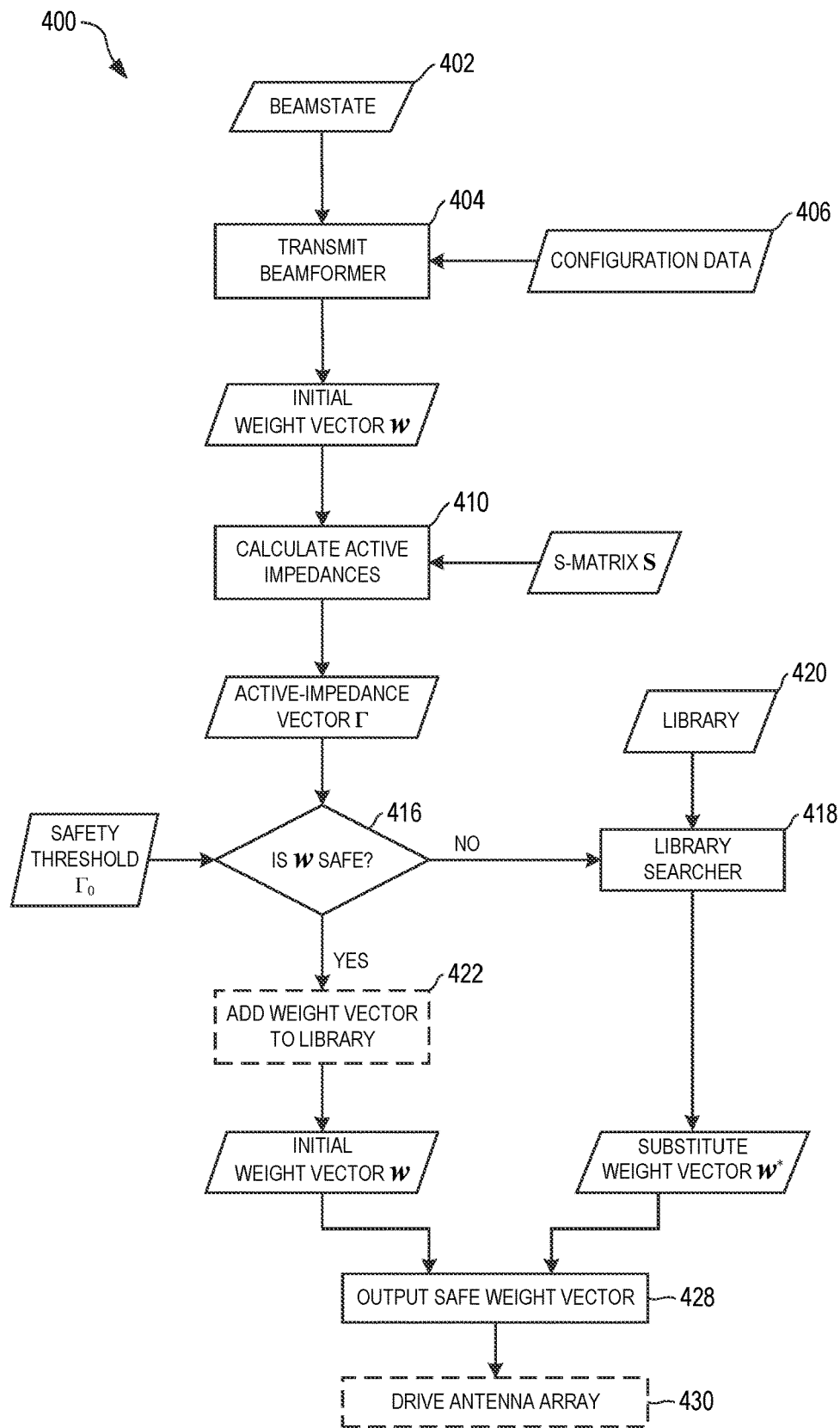
FIG. 4 is a flow chart of a method for controlling the antenna array of FIG. 1 in real-time without damage, in embodiments.

FIG. 4 is a flow chart of a method 400 for controlling the antenna array 100 without damage. The method 400 may be used with the multi-channel driver 200 of FIG. 2 to ensure that the power in any of the reverse signals 234 is not high enough to damage the corresponding power amplifier 206. For clarity in FIG. 4, data are depicted as non-rectangular parallelograms.

The method 400 begins with a beamstate 402 that specifies a plurality of beam parameters characterizing one or more electromagnetic beams of a target radiation pattern to be emitted by the antenna array 100. Examples of beam parameters include frequency, angular direction (e.g., azimuthal and polar angles), polarization, spatial beam width, side-lobe properties (e.g., an angular direction and level for each of one or more side lobes of the target radiation pattern), and null properties (e.g., an angular direction for each of one or more nulls of the target radiation pattern). When the target radiation pattern has two or more beams, the beamstate 402 may additionally specify beam parameters for each of the beams, as well as a relative amplitude and a relative phase for each pair of the beams. The beamstate 402 may specify additional or alternative beam parameters, or both, without departing from the scope hereof.

A transmit beamformer 404 determines, based on at least the beamstate 402, an initial weight vector $w$. Any beamformer algorithm known in the art may be used. Examples include, but are not limited to, a linearly constrained least squares beamformer, a conjugate-phase beamformer, and a random-excitation beamformer. As shown in FIG. 4, the configuration data 406 may also be used by the transmit beamformer 404 to determine the initial weight vector $w$. Examples of the configuration data 406 include, but are not limited to, the geometry, position, and orientation of each of the antenna elements 102, the number N of the antenna elements 102, and material properties of the antenna elements 102 (e.g., dielectric constants, electrical conductivities, etc.). The geometry, position, and orientation of each of the antenna elements 102 may be obtained from a model of the antenna array 100. The configuration data 406 may include additional or alternative data, or both, without departing from the scope hereof.

In the block 410 of the method 400, the initial weight vector w is transformed into an initial active-impedance vector F. In some embodiments, the S-matrix S characterizing the antenna array 100 is used with the block 410. Equation. 1 above is one example of the block 410 in which the S-matrix S is used to transform the initial weight vector w into a reverse-signal vector a. The elements of the reverse-signal vector a may then be additionally modified with the weights $w_i$ of the initial weight vector w to obtain the initial active-impedance vector Γ.

When the antenna array 100 operates over a sufficiently large bandwidth, the S-parameters of the S-matrix S may be frequency-dependent. In this case, the S-matrix S may be selected, based on a frequency specified by the beamstate 402, from a plurality of S-matrices characterizing the antenna array 100 at a corresponding plurality of frequencies. However, when the antenna array 100 is used in narrowband operation (i.e., when the dependencies of the S-parameters on frequency are small enough that the S-parameters can be assumed constant), the beamstate 402 need not specify the frequency, in which case only one S-matrix S is needed.

In the decision block 416, the modulus $|Γ_i|$ of each active impedance is compared to a safety threshold $Γ_0$ to determine if the corresponding reverse signal 234(i) will damage the power amplifier 206(i) of the multi-channel driver 200. If each modulus $|Γ_i|$ is less than the safety threshold $Γ_0$, then the initial weight vector w is safe. In this case, the initial weight vector w is passed to the block 428, in which the initial weight vector w is selected and outputted.

However, if one or more of the moduli $|F_i|$ are greater than the safety threshold FO, then the initial weight vector w is unsafe. In this case, the method 400 proceeds to a library searcher 418 that searches a library 420 of safe weight vectors to find a substitute weight vector w* that is similar to the initial weight vector w. The library 420 only stores weight vectors that are known to be safe, i.e., each weight vector stored in the library has active impedances whose moduli are all less than the safety threshold $Γ_0$. Therefore, any substitute weight vector w* selected from the library 420 can be used to drive the antenna array 100 without damage.

The similarity between two weight vectors can be quantified with a similarity measure, such as a cosine similarity. In this case, each of the two weight vectors represents a point in a 2N-dimensional vector space, wherein the cosine similarity is equal to the cosine of the angle between the two weight vectors. When the weight vectors are normalized, the cosine similarity simplifies to the dot product of the two weight vectors. Advantageously, the dot product involves only multiplication and summation, and therefore has a time complexity of O(N). Accordingly, the dot product can be performed efficiently by a computer, even for large value of N. The speed afforded by the dot product allows the library 420 to be very large (i.e., to store a large number of substitute weight vectors) without impeding the speed at which it is searched. A different type of similarity measure (e.g., Euclidean distance) may be used without departing from the scope hereof.

The library searcher 418 calculates the similarity measure between the initial weight vector w and each candidate weight vector retrieved from the library 420. When the similarity measure exceeds a similarity threshold (e.g., 0.95) for a candidate weight vector, the candidate weight vector may be selected as the substitute weight vector w*. The substitute weight vector w* may then be passed to the block 428, where it is selected and outputted as a safe alternative to the initial weight vector w.

The library searcher 418 may stop searching the library 420 once a single substitute weight vector w* has been found. Alternatively, the library searcher 418 may continue until a plurality of substitute weight vectors have been found. In this case, additional criteria may be used to select one of the substitute weight vectors. For example, each substitute weight vector may be stored in the library 420 with a largest modulus $Γ^{(max)}$ of its corresponding active impedances $Γ_i$ (i.e., $Γ^{(max)} ≥ |Γ_i|$ for all i). The library searcher 418 may select, as the substitute weight vector w*, the one substitute weight vector whose largest modulus $Γ^{(max)}$ is smallest (i.e., with the greatest safety margin). Without departing from the scope hereof, the library searcher 418 may use additional or alternative criteria to select w* from the plurality of substitute weight vectors.

In some embodiments, the method 400 includes a block 422 that operates when the initial weight vector w is safe. In the block 422, the library 420 is searched (e.g., by calling the library searcher 418) to find a weight vector whose similarity measure with the initial weight vector w exceeds the similarity threshold. If no such weight vector is found, then the initial weight vector w is inserted to the library 420 so that it can be used for subsequent searches. The initial weight vector w may be stored in the library 420 with its highest modulus $Γ^{(max)}$, a frequency specified by the beamstate 402, and/or other parameters.

In some embodiments, the method 400 includes a block 430 in which the antenna array 100 is driven according to the weight vector outputted by the block 428. That is, the antenna array 100 is driven with the initial weight vector w when the initial weight vector w is safe, or with the substitute weight vector w* when the initial weight vector w is unsafe. The similarity threshold may be selected such that the radiation pattern generated by the antenna array 100, when driven with the substitute weight vector w*, approximates the target radiation pattern represented by the beamstate 402. Specifically, increasing the similarity threshold ideally yields a substitute weight vector w* whose radiation pattern more closely approximates the target radiation pattern. However, as the similarity threshold increases, the likelihood that no substitute weight vector exists in the library 420 also increases.

Figure 5:
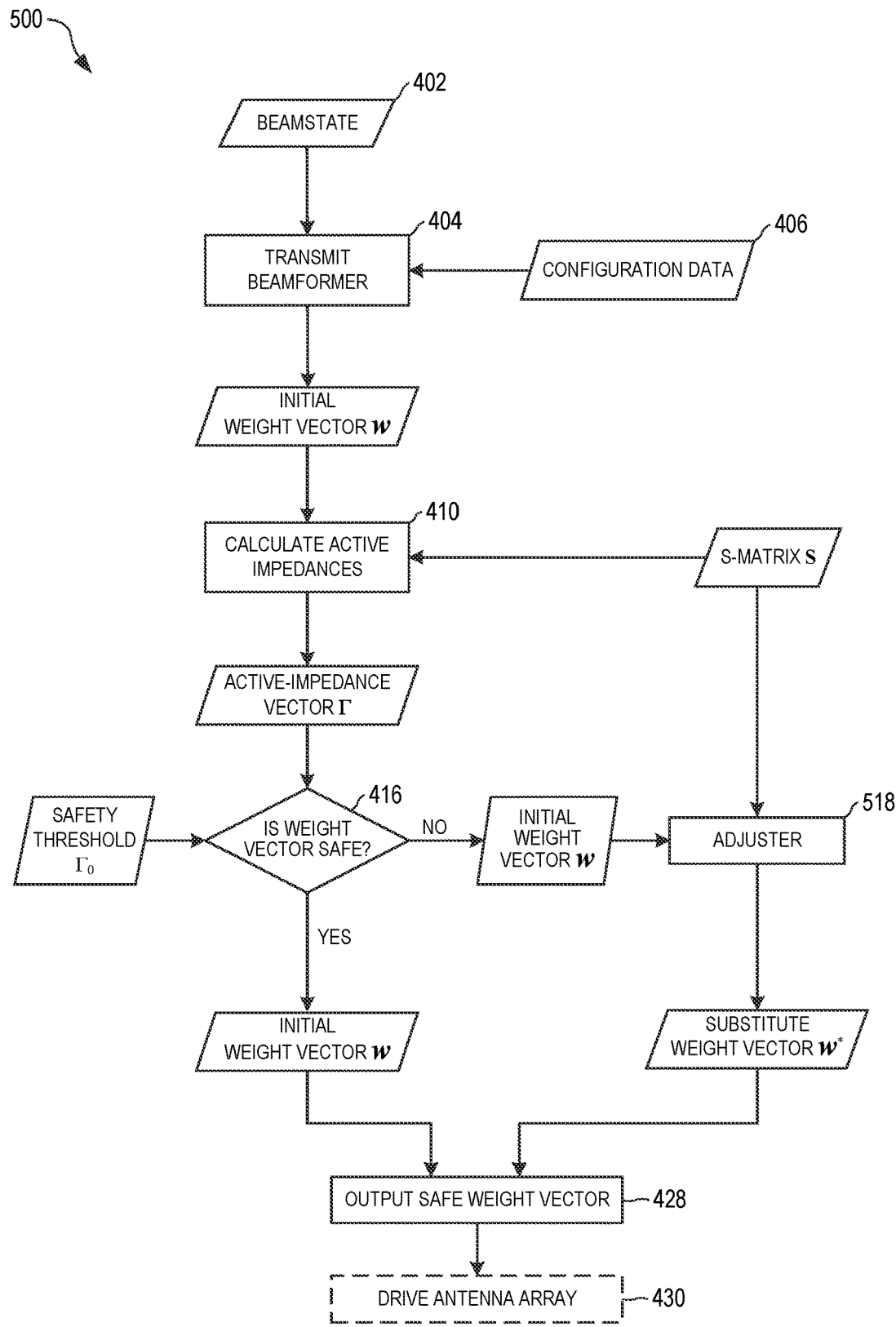
FIG. 5 is a flow chart of a method that is similar to the method of FIG. 4, except that it finds a substitute weight vector w* by adjusting a weight vector w instead of searching a library, in embodiments.

FIG. 5 is a flow chart of a method 500 that is similar to the method 400 of FIG. 4 except that the substitute weight vector w* is found by adjusting the initial weight vector w instead of searching a library. When it is determined (see the decision block 416) that the initial weight vector w is unsafe, the initial weight vector w and S-matrix S are passed to an adjuster 518 that adjusts the initial weight vector w to find the substitute weight vector w*.

The adjuster 518 is based on the idea that each active impedance Tt is a differentiable function of the complex weights $w_i$ of the initial weight vector w and the complex S-parameters of the S-matrix S (see Eqns. 1 and 2). Thus, a small change in any weight $w_i$ yields a similarly small change in the active impedance $Γ_i$. Here, the term "small" means that the effect of the small change on the radiation pattern (e.g., a change in the direction or power of a transmitted beam) is small enough to be tolerable for the application at hand. Accordingly, the method 500 may be faster than the method 400 at finding the substitute weight vector w* when the initial weight vector w is "close" to being safe (i.e., any active impedance $Γ_i$, of the active-impedance vector Γ, whose modulus exceeds the safety threshold $\Gamma_0$ only does so by a small amount), when only a small number (e.g., one or two) of the active impedances Tt have moduli exceeding the safety threshold FO, or both.

Figure 6:
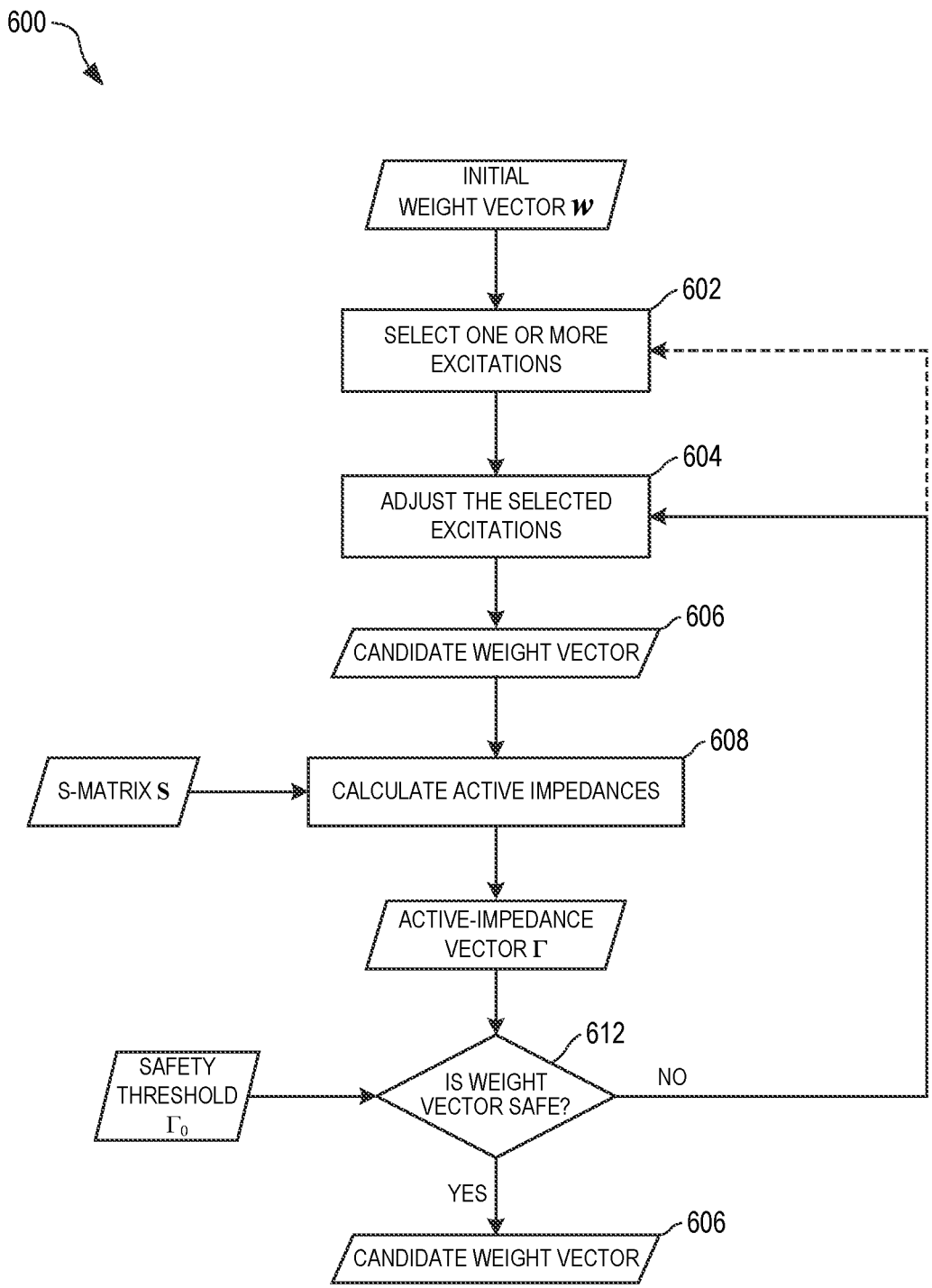
FIG. 6 is a flow chart of an adjustment method that may be used with the method of FIG. 5, in embodiments.

FIG. 6 is a flow chart of an adjustment method 600 that may be used for the adjuster 518 of FIG. 5. The method 600 begins with the initial weight vector w (which has already been determined as being unsafe; see the decision block 416 in FIG. 5). In the block 602 of the method 600, one or more excitations of the initial weight vector w are selected. In the block 604, each selected excitation is adjusted (e.g., by varying one or both of its amplitude and phase) to generate a candidate weight vector 606. In the block 608, candidate active impedances Tt of the candidate weight vector 606 are calculated (e.g., using the S-matrix S) to generate a candidate active-impedance vector $\Gamma$. The block 608 is therefore similar to the block 410 of FIGS. 4 and 5. In the decision block 612, the modulus $|\Gamma_i|$ of each candidate active impedance Tt is compared to the safety threshold $\Gamma_0$ to determine if the candidate weight vector 606 is safe. The decision block 612 is therefore similar to the decision block 416 of FIGS. 4 and 5. If the candidate weight vector 606 is safe, then it is outputted as the substitute weight vector w* and the method 600 stops. If the candidate weight vector 606 is unsafe, the method 600 returns to the block 604 to further adjust the excitations of the candidate weight vector 606 to generate another candidate weight vector 606. Alternatively, the method 600 may return to the block 602 to select alternative or additional excitations to adjust. In this manner, the method 600 may iterate many times until a safe candidate weight vector 606 is found.

The following discussion describes several techniques for selecting and adjusting parameters to reduce the moduli of one or more active impedances below the safety threshold. However, it should be appreciated by those trained in the art that there may be several ways to select and adjust parameters without significantly affecting the beamstate. This multitude of approaches arises from the dependency of each active impedance Tt on all the weights $w_i$ of the weight vector w (via corresponding S-parameters of the S-matrix S; see Eqn. 2). Thus, the modulus $|\Gamma_i|$ of each active impedance can be considered a nonlinear mathematical function whose "landscape" may not be intuitive. Accordingly, an attempt to reduce one modulus may inadvertently increase another, or produce other undesirable side effects.

In one example of the method 600, all the amplitudes $A_i$, and none of the phases $\phi_i$, of the weights $w_i$ are selected in the block 602 and reduced by the same multiplicative scale factor (e.g., 10%) in the block 604. This reduces the output power of the antenna array 100 without changing any other beam parameter. While the amplitudes $A_i$ are updated via multiplicative scaling in this example, it should be understood that amplitudes and/or phases may also be updated via additive stepping. For example, one step size may be used for adjusting all the amplitudes, with a second step size being used for adjusting all the phases. Alternatively, each amplitude and phase may have its own step size. Any of these step sizes may also be changed adaptively as the method 600 iterates and updates the candidate weight vector 606.

Although not shown in FIG. 6, the method 600 may incorporate checks to stop when it fails to find a candidate weight vector 606 that is safe. For example, the method 600 may count the number of times it iterates, and stop after a preset number. In this way, the method 600 may prevent infinite loops. In another example, the method 600 may stop when any one or more of the excitations has changed more than a predefined amount from its original value or has reached a boundary of a range within which the excitation should be confined.

Figure 7:
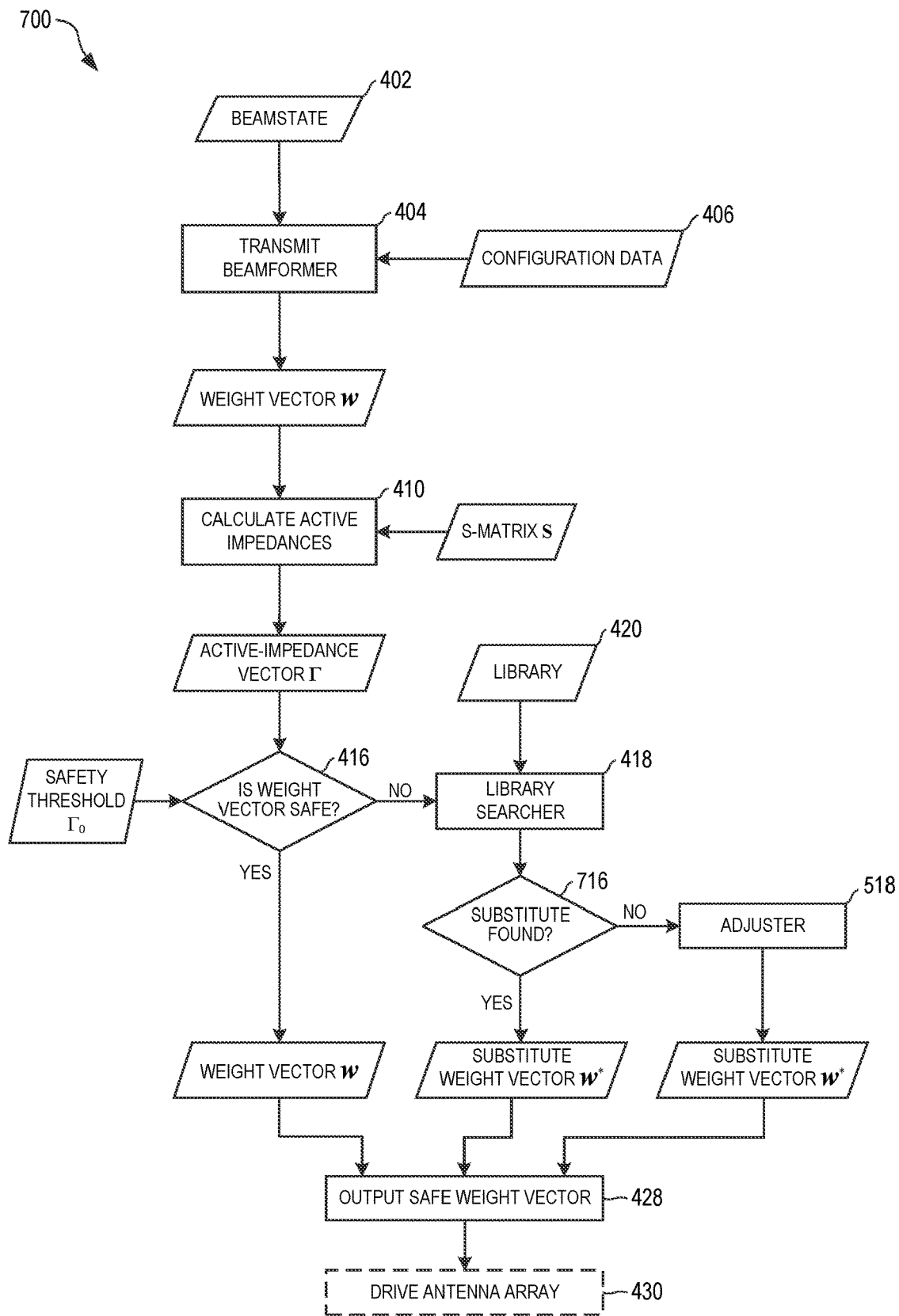
FIG. 7 is a flow chart of a method that combines the methods of FIGS. 4 and 5, in embodiments.

FIG. 7 is a flow chart of a method 700 that combines the methods 400 and 500. In the method 700, when the initial weight vector w is determined to be unsafe at the decision block 416, the library searcher 418 is called to search the library 420 for a substitute weight vector w*. When the library searcher 418 has finished, a decision 716 determines if a substitute weight vector w* was found in the library 420. If so, the substitute weight vector w* found by the library searcher 418 is passed to the block 428. If, however, the library searcher 418 fails to find a substitute weight vector w*, then the method 700 continues to the adjuster 518. The output of the adjuster 518, when found, is passed to the block 428. The block 428 then outputs one of: (i) the initial weight vector w when it is determined that the initial weight vector w is safe, (ii) a substitute weight vector w* found by the library searcher 418 in the library 420, and (iii) a substitute weight vector w* found by adjusting the initial weight vector w.

While the method 700 shows the library searcher 418 preceding the adjuster 518, the method 700 may be alternatively implemented with these blocks reversed, i.e., the adjuster 518 may first try to adjust the initial weight vector w to find a substitute weight vector w* that is safe. Only when the adjuster 518 cannot identify a substitute weight vector w* does the library searcher 418 search the library 420.

In other embodiments, one or more additional conditions may be used to determine whether the library searcher 418 or adjuster 518 should be called. For example, an excess impedance $\Delta\Gamma_i$, equal to the amount by which the modulus $|\Gamma_i|$ of each active impedance $\Gamma_i$ exceeds the safety threshold $\Gamma_0$, may be computed. If the number of positive excess impedances is less than a predefined number (e.g., two or three), then the initial weight vector w may already be "close" to being safe. In this case, it may be more likely that the adjuster 518 can successfully find a substitute weight vector w* faster than the library searcher 418. Accordingly, the adjuster 518 is called first, and the library searcher 418 is only called subsequently if the adjuster 518 fails to find a substitute weight vector w*. By contrast, if there are several positive excess impedances (e.g., more than three), then the initial weight vector w may be "far" from being safe. In this case, it may be more likely that the library searcher 418 can find a substitute weight vector w* faster than the adjuster 518. Accordingly, the library searcher 418 is called first, and the adjuster 518 is only called if the library searcher 418 fails to find a substitute weight vector w*.

In other embodiments, the initial choice between the library searcher 418 and the adjuster 518 is based on the values of the excess impedances $\Delta\Gamma_i$. For example, the presence of at least one large (e.g., above a predetermined threshold) positive excess impedance $\Delta\Gamma_i$ may indicate that the initial weight vector w is "far" from safe, wherein the library searcher 418 is called first. On the other hand, the absence of any large positive excess impedances $\Delta\Gamma_i$ may indicate that the initial weight vector w is almost safe, wherein the adjuster 518 is called first.

Figure 8:
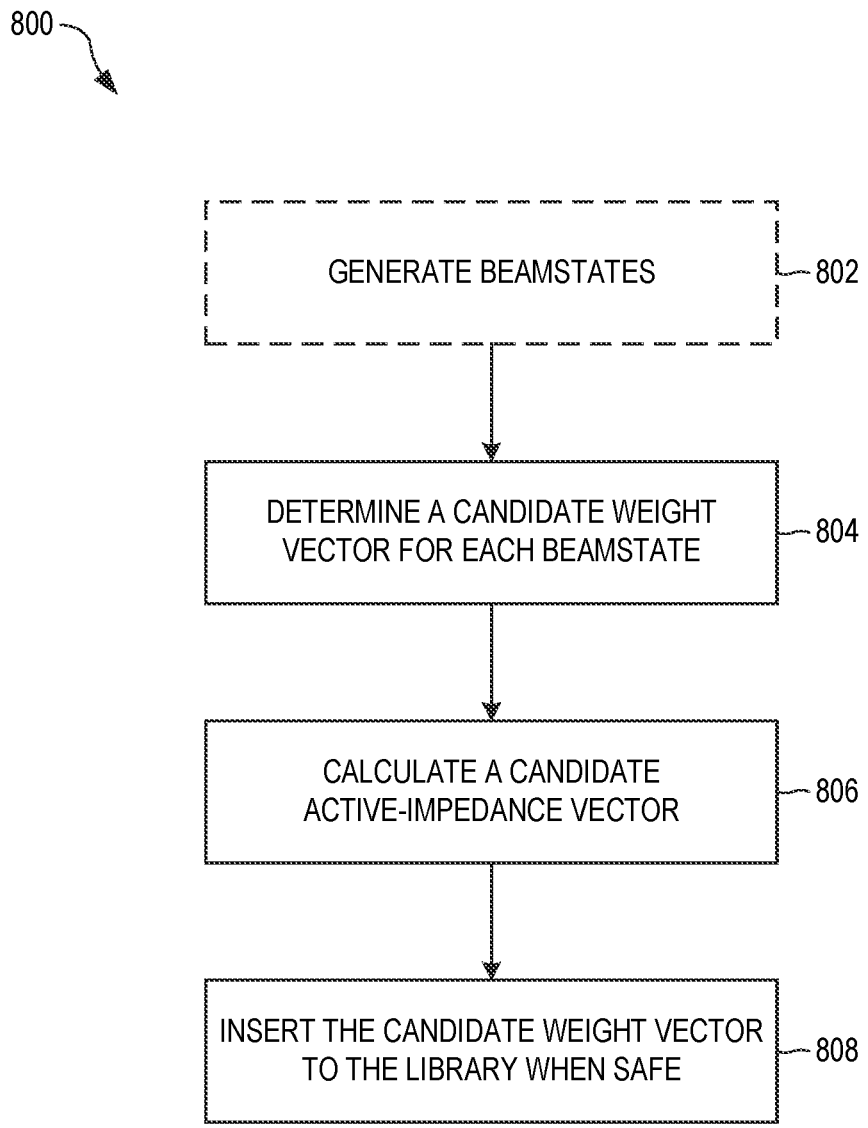
FIG. 8 is a flow chart of a method for constructing a library of safe weight vectors, in embodiments.

FIG. 8 is a flow chart of a method 800 for constructing the library 420 of safe weight vectors. The method 800 may be implemented on a computer. In some situations (e.g., when the antenna array has many antenna elements 102), the complexity of the method 800 is great enough that a high-performance computing system may be necessary for the method 800 to finish within a reasonable amount of time (e.g., a few days or less). In such situations, the method 800 may be best implemented on, for example, a massively multicore computing system having thousands of CPU and/or GPU cores. However, the method 800 may be implemented using any other type of high-performance computing system without departing from scope hereof.

The method 800 begins with a plurality of beamstates, each specifying one or more properties of a corresponding radiation pattern. For example, each beamstate may specify one or more of a frequency, polar angle, azimuthal angle, and polarization of each of one or more beams of the corresponding radiation pattern. For a radiation pattern with two or more beams, the corresponding beamstate may further specify a relative amplitude and a relative phase for each pair of the two of more beams.

In the block 804 of the method 800, a candidate weight vector of excitations is determined for each beamstate. The excitations of each candidate weight vector correspond to the antenna elements 102 of the antenna array 100, i.e., each excitation of each weight vector determines how a corresponding one of the antenna elements 102 is to be electrically driven such that the antenna array 100 generates the corresponding radiation pattern. The block 804 may iteratively use the transmit beamformer 404 of FIG. 4 to determine each candidate weight vector. Like the transmit beamformer 404, the configuration data 406 of the antenna array 100 may be used with the block 804 to determine each weight vector. The block 804 may implement any type of beamforming algorithm known in the art, such as a linearly constrained least squares beamformer, a conjugate-phase beamformer, or a random-excitation beamformer.

In the block 806 of the method 800, a candidate active-impedance vector is calculated based on the candidate weight vector determined with the block 804. The block 806 may iteratively use the block 410 of FIG. 4 to determine each candidate active-impedance vector. Like the block 410, an S-matrix may be used with the block 804 to determine each candidate active-impedance vector. The S-matrix may be one of a plurality of S-matrices that characterize the antenna array at a corresponding plurality of frequencies. Accordingly, when the corresponding beamstate specifies a frequency, the one S-matrix corresponding to the specified frequency may be selected from the plurality of S-matrices. In some embodiments, the method 800 further includes a block in which a model (e.g., analytical, numerically, reduced-order, etc.) is used to generate the plurality of S-matrices.

In the block 808 of the method 800, each candidate weight vector is inserted to the library 420 as one of the safe weight vectors when no active impedance, of the candidate active-impedance vector, has a modulus exceeding a safety threshold. The block 808 may be implemented by iterating the decision block 416 of FIG. 4 over each candidate active-impedance vector to determine whether said each active-impedance vector is safe. When a candidate active-impedance vector is unsafe (i.e., it has at least one active impedance whose modulus exceeds the safety threshold), the corresponding candidate weight vector may be discarded so that it is not inserted to the library 420. When a candidate active-impedance vector is safe, the largest modulus of its active impedances may be stored with the candidate weight vector in the library 420. As described in more detail below, the largest modulus may be used to select between multiple safe weight vectors found in the library. In addition, a candidate weight vector may be stored in the library 420 with a frequency specified by the corresponding beamstate.

In some embodiments, the method 800 includes the block 802 in which the plurality of beamstates is generated. As an example of the block 802, the plurality of beamstates may be generated by forming all combinations of beam parameters used to specify the beamstates. For example, a two-dimensional field-of-view seen by the antenna array 100 may be divided into a plurality of two-dimensional facets. A center of each facet is uniquely identified with a combination of polar and azimuthal angles, as measured from a center of the antenna array 100, and thus corresponds to a unique angular beamstate. Similarly, a number of polarization states may be selected (e.g., two), and a number of frequency bands may be selected (e.g., 1000). A set of single-beam beamstates may then be generated by forming all combinations of the angular beamstates, polarization states, and frequency bands. A combination may be excluded from the set if it is known (e.g., based on the application) that the combination will not be used. The set of beamstates is the plurality of beamstates when the antenna array 100 will only be operated to generate a single beam at any given time. However, pairs of the angular beamstates (and/or other beam parameters) may be considered to generate a set of two-beam beamstates, trios of the angular beamstates may be considered to generate a set of three-beam beamstates, and so on. These sets of beamstates may then be grouped together to form the plurality of beamstates when the antenna array 100 may be operated to generate different numbers of beams at different times.

Figure 9:
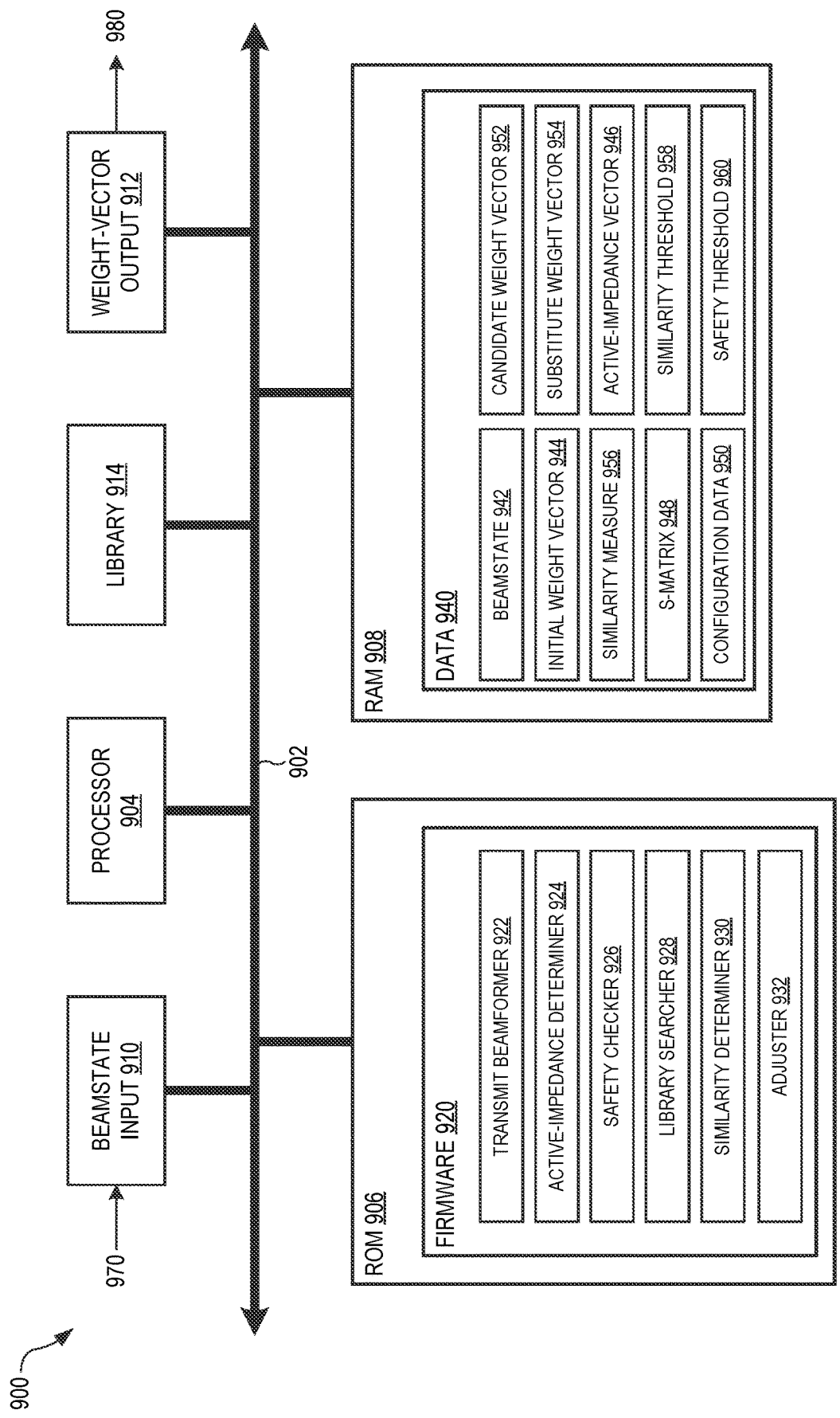
FIG. 9 is a functional diagram of a computer system for controlling the antenna array of FIG. 1, in embodiments.

FIG. 9 is a functional diagram of a computer system 900 for controlling the antenna array 100 of FIG. 1. The computer system 900 may be implemented, for example, as an embedded system located proximate to one or both of the antenna array 100 and the multi-channel driver 200. The computer system 900 includes a read-only memory (ROM) 906 and a random-access memory (RAM) 908 that communicate with a processor 904 over a system bus 902. The computer system 900 also includes a library 914 of safe weight vectors (e.g., see the library 420 in FIGS. 4 and 7). The library 914 may be implemented with a secondary storage device (e.g., a hard disk drive, solid-state drive, optical storage device, etc.) that communicates with the processor 904 and the RAM 908 over the system bus 902. The computer system 900 also includes a beamstate input block 910 that communicates with a peripheral device (e.g., an AESA controller) to receive beamstate data 970, and a weight-vector output block 912 that communicates weight-vector data 980 to another peripheral device (e.g., the multi-channel driver 200). The blocks 910 and 912 are also connected to the system bus 902, and therefore communicate with the processor 904, store data 940 in the RAM 908, and retrieve data 940 from the RAM 908.

The processor 904 may be any type of circuit capable of performing logic, control, and input/output operations. For example, the processor 904 may include one or more of a microprocessor with one or more central processing unit (CPU) cores, a graphics processing unit (GPU), a digital signal processor (DSP), a field-programmable gate array (FPGA), a system-on-chip (SoC), and a microcontroller unit (MCU). The processor 904 may also include a memory controller, bus controller, one or more co-processors, and/or other components that manage data flow between the processor 904 and other components communicably coupled to the system bus 902. The processor 904 may be implemented as a single integrated circuit (IC), or as a plurality of ICs. In some embodiments, one or more of the processor 904, ROM 906, RAM 908, beamstate input block 910, and weight-vector output block 912 are implemented as a single IC. The processor 904 may use a complex instruction set computing (CISC) architecture, or a reduced instruction set computing (RISC) architecture.

The ROM 906 stores machine-readable instructions (shown as firmware 920 in FIG. 9) that, when executed by the processor 904, control the computer system 900 to implement the functionality described herein. In FIG. 9, the firmware 920 includes a transmit beamformer 922 that implements the transmit beamformer 404 of FIGS. 4-5 and 7, an active-impedance determiner 924 that implements the block 410 of FIGS. 4-5 and 7, a safety checker 926 that implements the decision block 416 of FIGS. 4-5 and 7, a library searcher 928 that implements the library searcher 418 of FIGS. 4 and 7, a similarity determiner 930, and an adjuster 930 that implements the adjuster 518 of FIGS. 5 and 7. However, the ROM 906 may store additional machine-readable instructions (e.g., operating system instructions, I/O control instructions, etc.) without departing from the scope hereof. The ROM 906 may be implemented using non-volatile memory, such as flash memory, NVRAM, FRAM, MRAM, EEPROM, EPROM, or any combination thereof.

The RAM 908 stores data 940 used by the processor 904 when executing the firmware 920. In FIG. 9, the data 940 includes a beamstate 942, an initial weight vector 944, an active-impedance vector 946, an S-matrix 948, configuration data 950, a candidate weight vector 952, a substitute weight vector 954, a similarity measure 956, a similarity threshold 958, and a safety threshold 960. However, the RAM 908 may store additional data 940 without departing from the scope hereof. The RAM 908 may be implemented using volatile memory, such as DRAM, SRAM, or a combination thereof.

Each of the beamstate input block 910 and the weight-vector output block 912 is configured so that the computer system 900 can communicate with one or more peripheral devices. For example, the beamstate input block 910 may receive beamstate data 970 from a peripheral device and store the received beamstate data 970 in the RAM 908 as the beamstate 942. Similarly, the weight-vector output block 912 may retrieve the substitute weight vector 954 from the RAM 908 and output the substitute weight vector 954 to a peripheral device as weight-vector data 980. Accordingly, each of the blocks 910 and 912 may implement a communication protocol that sends data to peripheral devices, receives data from peripheral devices, or both. For example, each of the blocks 910 and 912 may be a serial communication interface (e.g., RS-232, RS-422, RS-485, etc.), a parallel communication interface (e.g., GPIB, PCI, SCSI, etc.), a synchronous serial communication interface (e.g., I2C, SPI, SSC, etc.), a universal serial bus (USB) interface, a multi-media card interface (e.g., SD card, Compact Flash, etc.), a wired network interface (e.g., Ethernet, Infiniband, Fibre Channel, etc.), a wireless network interface (e.g., WiFi, Bluetooth, BLE, ZigBee, ANT, etc.), a cellular network interface (e.g., 3G, 4G, 5G, LTE), an optical network interface (e.g., SONET, SDH, IrDA, etc.), and a fieldbus interface. In some embodiments, the computer system 900 receives the beamstate data 970 from and sends the weight-vector data 980 to the same peripheral device, wherein only one I/O block (i.e., only one of the blocks 910 and 912) is needed.

Although not shown in FIG. 9, the computer system 900 may include additional I/O functionality, as needed, for communicating with additional peripheral devices. For example, the computer system 900 may include one or more additional network interfaces (e.g., an Ethernet port or WiFi adapter) used to program the firmware 920 into the ROM 906. Similarly, the one or more additional network interfaces may be used to initially populate the library 914 with an initial set of safe weight vectors, or to update the library 914 (i.e., add new safe weight vectors to the library 914, or delete safe weight vectors already in the library 914) as part of maintaining the computer system 900. For example, safe weight vectors in the library 914 that have been used infrequently, or never, may be replaced with safe weight vectors whose beamstates are more useful for the application at hand. Removing infrequently used weight vectors from the library 914 can help ensure that a size of the library 914 does not become so big that access times become a timing bottleneck during operation.

In the data 940 of FIG. 9, the beamstate 942 corresponds to the beamstate 402 of FIG. 4, the initial weight vector 944 corresponds to the initial weight vector w of Eqn. 1 and FIG. 4, the substitute weight vector 954 corresponds to the substitute weight vector w* of FIG. 4, the active-impedance vector 946 corresponds to the active-impedance vector F of Eqn. 2 and FIG. 4, the S-matrix 948 corresponds to the S-matrix 300 of FIG. 3 and the S-matrix S of Eqn. 1 and FIG. 4, the configuration data 950 corresponds to the configuration data 406 of FIG. 4, and the safety threshold 960 corresponds to the safety threshold $\Gamma_0$ of FIG. 4. Since the S-matrix 948 and configuration data 950 correspond to properties of the antenna array 100 that are not expected to change over time, the S-matrix 948 and configuration data 950 may be alternatively stored once in non-volatile memory, thereby ensuring that the computer system 900 retains the S-matrix 948 and configuration data 950 during power loss.

When the processor 904 executes the transmit beamformer 922, the computer system 900 determines, based on the beamstate 942, the initial weight vector 944 of excitations of corresponding antenna elements 102 of the antenna array 100 of FIG. 1. The transmit beamformer 922 may utilize the configuration data 950. When the processor 904 executes the active-impedance determiner 924, the computer system 900 transforms the initial weight vector 944 into the active-impedance vector 946 corresponding to the antenna elements. The active-impedance determiner 924 may utilize the S-matrix 948. When the processor 904 executes the safety checker 926, the computer system 900 determines if any active impedance of the active-impedance vector 946 has a modulus exceeding the safety threshold 960. When at least one of the active impedances has a modulus exceeding the safety threshold 960, the processor 904 may execute the library searcher 928, wherein the computer system 900 searches the library 914 to find a substitute weight vector 954 such that the initial weight vector 944 and the substitute weight vector 954 have a similarity measure 956 that exceeds the similarity threshold 958. The substitute weight vector 954 has corresponding active impedances (not shown in FIG. 9 and not necessarily stored in the library 914) whose moduli are all less than the safety threshold 960. When an appropriate substitute weight vector 954 is identified, the weight-vector output block 912 may output the substitute weight vector 954 as the weight-vector data 980. Alternatively, when none of the active impedances of the active-impedance vector 946 has a modulus exceeding the safety threshold 960, the weight-vector output block 712 may output the initial weight vector 944 as the weight-vector data 980.

The library searcher 928 may use the similarity determiner 930 to calculate the similarity measure 956 between the initial weight vector 944 and a candidate weight vector 952 retrieved from the library 914. The similarity determiner 930 may calculate, as the similarity measure 956, a cosine similarity, a Euclidean distance, or a different type of similarity between the weight vectors 944 and 952. The library searcher 928 may then compare the similarity measure 956 to the similarity threshold 958 to determine if the candidate weight vector 952 is an acceptable alternative to the initial weight vector 944. If so, the candidate weight vector 952 may be stored as the substitute weight vector 954. In some embodiments, multiple candidate weight vectors 952 are acceptable alternatives to the initial weight vector 944, wherein the library searcher 928 may use an additional criterion (or criteria) to select one of the acceptable alternatives as the substitute weight vector 954. For example, each candidate weight vector 952 may include a largest modulus of its corresponding active impedances, wherein the library searcher 928 selects from the acceptable alternative the one whose largest modulus is smallest. Thus, the library searcher 928 selects the acceptable alternative with the greatest safety margin.

Alternatively or additionally, the processor may execute the adjuster 932 to adjust one or more excitations of the initial weight vector 944, when unsafe, to generate the candidate weight vector 952. The active-impedance determiner 924 may then transform the candidate weight vector 952 into the active-impedance vector 946, which the safety checker 926 then checks to determine if the candidate weight vector 952 is safe. The adjuster 932 may also call the similarity determiner 930. When the candidate weight vector 952 is safe and has a similarity measure, with the initial weight vector 944, that exceeds the similarity threshold 958, the candidate weight vector 952 is an acceptable alternative to the initial weight vector 944. The candidate weight vector 952 may then be stored as the substitute weight vector 954.

In some embodiments, the firmware 920 includes additional machine-readable instructions that, when executed by the processor 904, control the computer system 900 to insert the initial weight vector 944 to the library 914 when the initial weight vector 944 is safe and not already stored in the library 914. More specifically, when none of the active impedances of the active-impedance vector 946 has a modulus exceeding the safety threshold 960, the additional machine-readable instructions control the computer system 900 to search the library 914 for an additional weight vector such that the initial weight vector 944 and the additional weight vector have a similarity measure 956 exceeding the similarity threshold 958. If no such additional weight vector is found in the library 914, the computer system 900 then inserts the initial weight vector 944 to the library 914. The computer system 900 may store the initial weight vector 944 in the library 914 with the largest modulus of its corresponding active impedances, a frequency specified by the beamstate 942, or both.

Where the beamstate 942 specifies a frequency, the transmit beamformer 922 and active-impedance determiner 924 may use the specified frequency during execution. For example, the S-matrix 948 may store a plurality of S-matrices that characterize the antenna array 100 at a corresponding plurality of frequencies. In this case, the active-impedance determiner 924 may select, from the plurality of S-matrices, the one S-matrix corresponding to the specified frequency, and use the selected one S-matrix to transform the initial weight vector 944 into the active-impedance vector 946.

The transmit beamformer 922 may implement any type of beamforming algorithm known in the art, such as a linearly constrained least squares beamformer, a conjugate-phase beamformer, or a random-excitation beamformer. In some embodiments, the computer system 900 receives the initial weight vector 944 from a peripheral device instead of the beamstate 942, wherein the firmware 920 excludes the transmit beamformer 922. In these embodiments, the computer 900 may receive a specified frequency with the initial weight vector 944 so that an appropriate S-matrix can be selected for transforming the initial weight vector 944 into the active-impedance vector 946.

In some embodiments, the functionality of the computer system 900 is implemented within a different computer system used with the antenna array 100. For example, when the antenna array 100 cooperates with an AESA controller that includes an AESA computer system, the functionality described herein for the computer system 900 may be alternatively implemented within the AESA computer system. Similarly, where the multi-channel driver 200 is controlled via a driver computer, the functionality described herein for the computer system 900 may be alternatively implemented within the driver computer. In other embodiments, the computer system 900 includes 2N digital-to-analog converters (DACs) communicably coupled to the processor 904 via the system bus 902, wherein the DACs generate the N attenuator control signals 220 and the N phase-shifter control signals 222 (see FIG. 2). In these embodiments, the computer system 900 may directly interface with the multi-channel driver 200.

While FIG. 9 shows the computer system 900 with one system bus 902, the computer system 900 may be implemented with a different type of architecture without departing from the scope hereof. For example, when the firmware 920 and data 940 are stored in separate memories, as shown in FIG. 9, the firmware 920 and data 940 may be communicated to/from the processor 904 using separate buses. In this case, the firmware 920 and data 940 may be stored in separate memory spaces, thereby implementing a Harvard architecture. Alternatively, the processor 904 may include one or more layers of cache so that the computer system 900 implements a modified Harvard architecture using only the one system bus 902. In some embodiments, the firmware 920 is stored as an application in secondary storage (e.g., a hard drive), and loaded into the RAM 908 upon powering on (i.e., boot up); in this case, the application and the data 940 share the same memory space, thereby implementing a von Neumann architecture.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for controlling an antenna array, comprising:
  determining, based at least on a beamstate, an initial weight vector of excitations of corresponding antenna elements of the antenna array; and
  when the initial weight vector is unsafe:
    identifying, based at least on the initial weight vector, a substitute weight vector such that (i) the initial and substitute weight vectors have a similarity measure that exceeds a similarity threshold and (ii) the substitute weight vector is safe; and
    driving the antenna array according to the substitute weight vector to emit radiation;

wherein the emitted radiation has a transmitted radiation pattern that approximates a target radiation pattern of the beamstate.

2. The method of claim 1, further comprising:
transforming the initial weight vector into an initial active-impedance vector of initial active impedances; and
identifying the initial weight vector as unsafe when at least one of the initial active impedances has a modulus that exceeds a safety threshold.

3. The method of claim 2, wherein said transforming utilizes an S-matrix that characterizes the antenna array.

4. The method of claim 2, wherein:
the beamstate specifies a frequency;
the method further comprises selecting, based on the frequency, one S-matrix from a plurality of S-matrices that characterize the antenna array at a corresponding plurality of frequencies;
said transforming utilizes the one S-matrix; and
said generating includes driving the antenna array at the frequency.

5. The method of claim 1, wherein:
said identifying comprises searching a library of safe weight vectors to find the substitute weight vector; and
each of the safe weight vectors in the library transforms into a safe active-impedance vector of safe active impedances, each of the safe active impedances having a modulus below a safety threshold.

6. The method of claim 5, wherein said searching includes, for each of a plurality of candidate weight vectors stored in the library:
calculating the similarity measure between the initial weight vector and said each of the plurality of candidate weight vectors; and
comparing the similarity measure to the similarity threshold.

7. The method of claim 5, wherein:
the beamstate specifies a frequency;
said searching includes searching the library for only safe weight vectors corresponding to the frequency; and
said generating includes driving the antenna array at the frequency.

8. The method of claim 5, further comprising:
searching, when the initial weight vector is safe, the library of safe weight vectors for a candidate weight vector such that the initial and candidate weight vectors have a similarity measure that exceeds the similarity threshold; and
inserting, when no candidate weight vector is found, the initial weight vector to the library as one of the safe weight vectors.

9. The method of claim 5, wherein:
each of the safe weight vectors is stored in the library with a largest modulus of its corresponding safe active impedances; and
said searching the library includes:
finding a plurality of candidate weight vectors, of the safe weight vectors, such that the initial weight vector and each of the plurality of candidate weight vectors has a similarity measure that exceeds the similarity threshold; and
selecting, as the substitute weight vector, the one of the plurality of candidate weight vectors whose largest modulus is smallest.

10. The method of claim 5, further comprising adjusting, when the substitute weight vector is not found in the library, at least one of the excitations to create the substitute weight vector.

11. The method of claim 1, wherein said identifying comprises:
adjusting at least one of the excitations to create a candidate weight vector; and
selecting the candidate weight vector as the substitute weight vector when the candidate weight vector is safe.

12. The method of claim 11, wherein said adjusting includes adjusting one or both of an amplitude and a phase of said at least one of the excitations.

13. The method of claim 11, further comprising:
transforming the candidate weight vector into a candidate active-impedance vector of candidate active impedances; and
identifying the candidate weight vector as safe when each of the candidate active impedances has a modulus below a safety threshold.

14. The method of claim 13, further comprising iterating said adjusting and said transforming.

15. The method of claim 11,
further comprising searching, when no candidate weight vector is safe, a library of safe weight vectors to find the substitute weight vector;
each of the safe weight vectors in the library transforms into a safe active-impedance vector of safe active impedances, each of the safe active impedances having a modulus below a safety threshold.

16. The method of claim 1, further comprising driving, when the initial weight vector is safe, the antenna array according to the initial weight vector.

17. The method of claim 1, wherein said determining is further based on configuration data of the antenna array.

18. The method of claim 1, the similarity measure being a cosine similarity.

19. The method of claim 1, wherein said determining is based on one of: linearly constrained least squares beamforming, conjugate-phase beamforming, and random-excitation beamforming.

20. A system for controlling an antenna array, comprising:
a processor; and
a memory communicably coupled with the processor, the memory storing machine-readable instructions that, when executed by the processor, control the system to:
determine, based at least on a beamstate, an initial weight vector of excitations of corresponding antenna elements of the antenna array, and
when the initial weight vector is unsafe:
identify, based at least on the initial weight vector, a substitute weight vector such that (i) the initial and substitute weight vectors have a similarity measure that exceeds a similarity threshold and (ii) the substitute weight vector is safe, and
output the substitute weight vector to the antenna array;
wherein the antenna array, when driven according to the substitute weight vector, emits radiation having a transmitted radiation pattern that approximates a target radiation pattern of the beamstate.

21. The system of claim 20, the memory storing additional machine-readable instructions that, when executed by the processor, control the system to:
transform the initial weight vector into an initial active-impedance vector of initial active impedances, and identify the initial weight vector as unsafe when at least one of the initial active impedances has a modulus that exceeds a safety threshold.

22. The system of claim 21, wherein the machine-readable instructions that, when executed by the processor, control the system to transform include machine-readable instructions that, when executed by the processor, control the system to transform utilizing an S-matrix that characterizes the antenna array.

23. The system of claim 21, wherein:
the beamstate specifies a frequency;
the memory stores additional machine-readable instructions that, when executed by the processor, control the system to select, based on the frequency, one S-matrix from a plurality of S-matrices that characterize the antenna array at a corresponding plurality of frequencies; and
the machine-readable instructions that, when executed by the processor, control the system to transform include machine-readable instructions that, when executed by the processor, control the system to transform utilizing the one S-matrix.

24. The system of claim 20, wherein:
the machine-readable instructions that, when executed by the processor, control the system to identify include machine-readable instructions that, when executed by the processor, control the system to search a library of safe weight vectors to find the substitute weight vector; and
each of the safe weight vectors in the library transforms into a safe active-impedance vector of safe active impedances, each of the safe active impedances having a modulus below a safety threshold.

25. The system of claim 24, wherein the machine-readable instructions that, when executed by the processor, control the system to search include machine-readable instructions that, when executed by the processor, control the system to:
calculate the similarity measure between the initial weight vector and said each of the plurality of candidate weight vectors, and
compare the similarity measure to the similarity threshold.

26. The system of claim 24, wherein:
the beamstate specifies a frequency; and
the machine-readable instructions that, when executed by the processor, control the system to search include machine-readable instructions that, when executed by the processor, control the system to search the library for only safe weight vectors corresponding to the frequency.

27. The system of claim 24, the memory storing additional machine-readable instructions that, when executed by the processor, control the system to:
search, when the initial weight vector is safe, the library of safe weight vectors for a candidate weight vector such that the initial and candidate weight vectors have a similarity measure that exceeds the similarity threshold, and
insert, when no candidate weight vector is found, the initial weight vector to the library as one of the safe weight vectors.

28. The system of claim 24, wherein:
each of the safe weight vectors is stored in the library with a largest modulus of its corresponding safe active impedances; and
the machine-readable instructions that, when executed by the processor, control the system to search the library include machine-readable instructions that, when executed by the processor, control the system to:
find a plurality of candidate weight vectors, of the safe weight vectors, such that the initial weight vector and each of the plurality of candidate weight vectors has a similarity measure that exceeds the similarity threshold, and
select, as the substitute weight vector, the one of the plurality of candidate weight vectors whose largest modulus is smallest.

29. The system of claim 24, the memory storing additional machine-readable instructions that, when executed by the processor, control the system to adjust, when the substitute weight vector is not found in the library, at least one of the excitations to create the substitute weight vector.

30. The system of claim 24, further comprising a secondary storage communicably coupled to the processor, the secondary storage storing the library of safe weight vectors.

31. The system of claim 20, wherein the machine-readable instructions that, when executed by the processor, control the system to identify include machine-readable instructions that, when executed by the processor, control the system to:
adjust at least one of the excitations to create a candidate weight vector, and
select the candidate weight vector as the substitute weight vector when the candidate weight vector is safe.

32. The system of claim 31, wherein the machine-readable instructions that, when executed by the processor, control the system to adjust include machine-readable instructions that, when executed by the processor, control the system to adjust one or both of an amplitude and a phase of said at least one of the excitations.

33. The system of claim 31, the memory storing additional machine-readable instructions that, when executed by the processor, control the system to:
transform the candidate weight vector into a candidate active-impedance vector of candidate active impedances, and
identify the candidate weight vector as safe when each of the candidate active impedances has a modulus below a safety threshold.

34. The system of claim 33, the memory storing additional machine-readable instructions that, when executed by the processor, control the system to iterate the machine-readable instructions that control the system to adjust and transform.

35. The system of claim 31, wherein:
the memory stores additional machine-readable instructions that, when executed by the processor, control the system to search, when no candidate weight vector is safe, a library of safe weight vectors to find the substitute weight vector; and
each of the safe weight vectors in the library transforms into a safe active-impedance vector of safe active impedances, each of the safe active impedances having a modulus below a safety threshold.

36. The system of claim 20, the memory storing additional machine-readable instructions that, when executed by the processor, control the system to output the initial weight vector to the antenna array when the initial weight vector is safe.

37. The system of claim 20, wherein the machine-readable instructions that, when executed by the processor, control the system to determine include machine-readable instructions that, when executed by the processor, control the system to determine the initial weight vector further based on configuration data of the antenna array.

38. The system of claim 20, the similarity measure being a cosine similarity.

39. The system of claim 20, wherein the machine-readable instructions that, when executed by the processor, control the system to determine implement one of: a linearly constrained least squares beamformer, a conjugate-phase beamformer, and a random-excitation beamformer.

40. The system of claim 20, further comprising the antenna array.

\* \* \* \* \*